Feb. 6, 1962  R. G. FERRIS  3,019,763
MOBILE MILKING HOUSE AND MILK ROOM
Filed Jan. 14, 1960  2 Sheets-Sheet 1
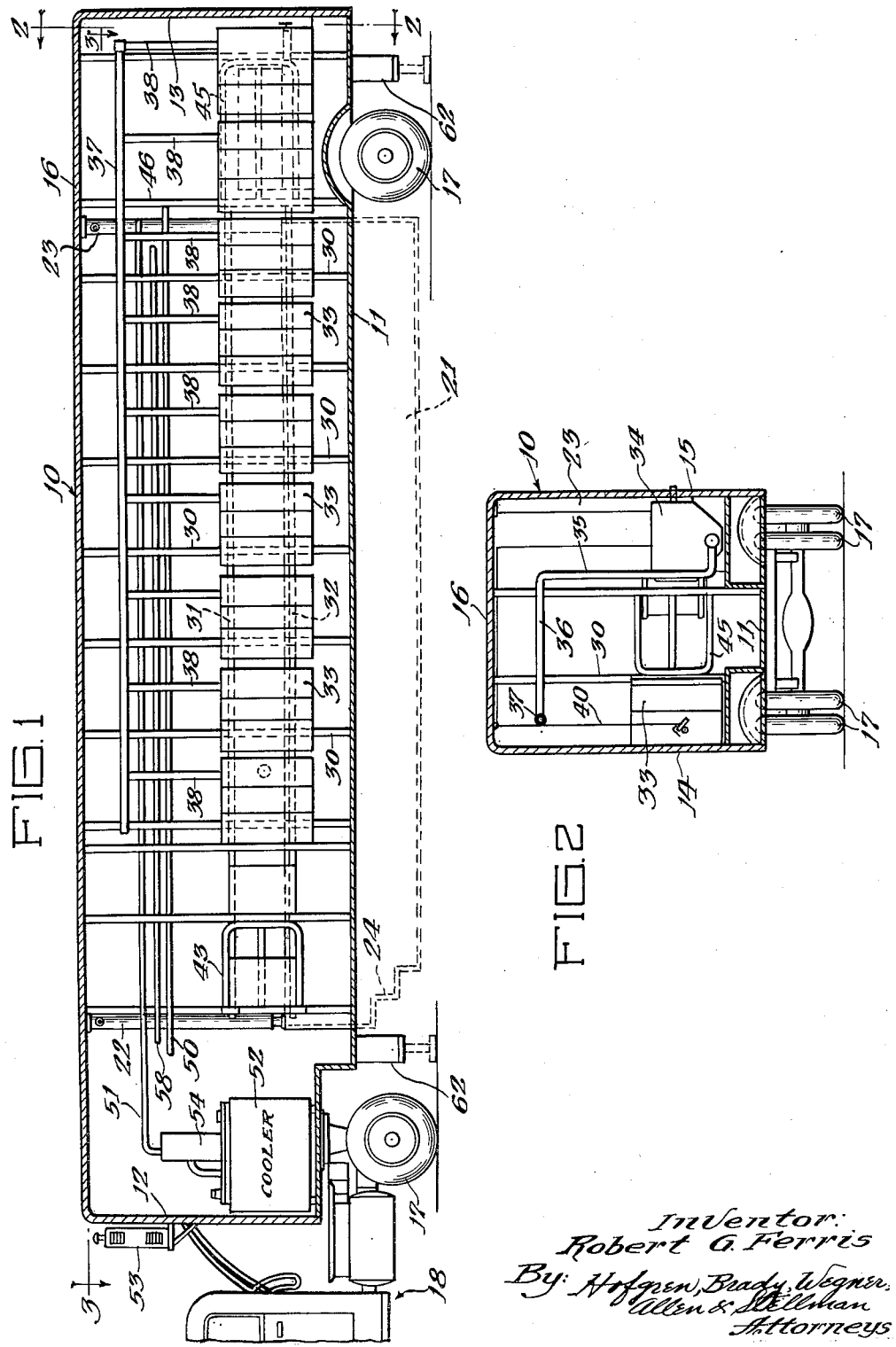
Inventor:
Robert G. Ferris
By: Hofgren, Brady, Wegner,
Allen & Stellman
Attorneys

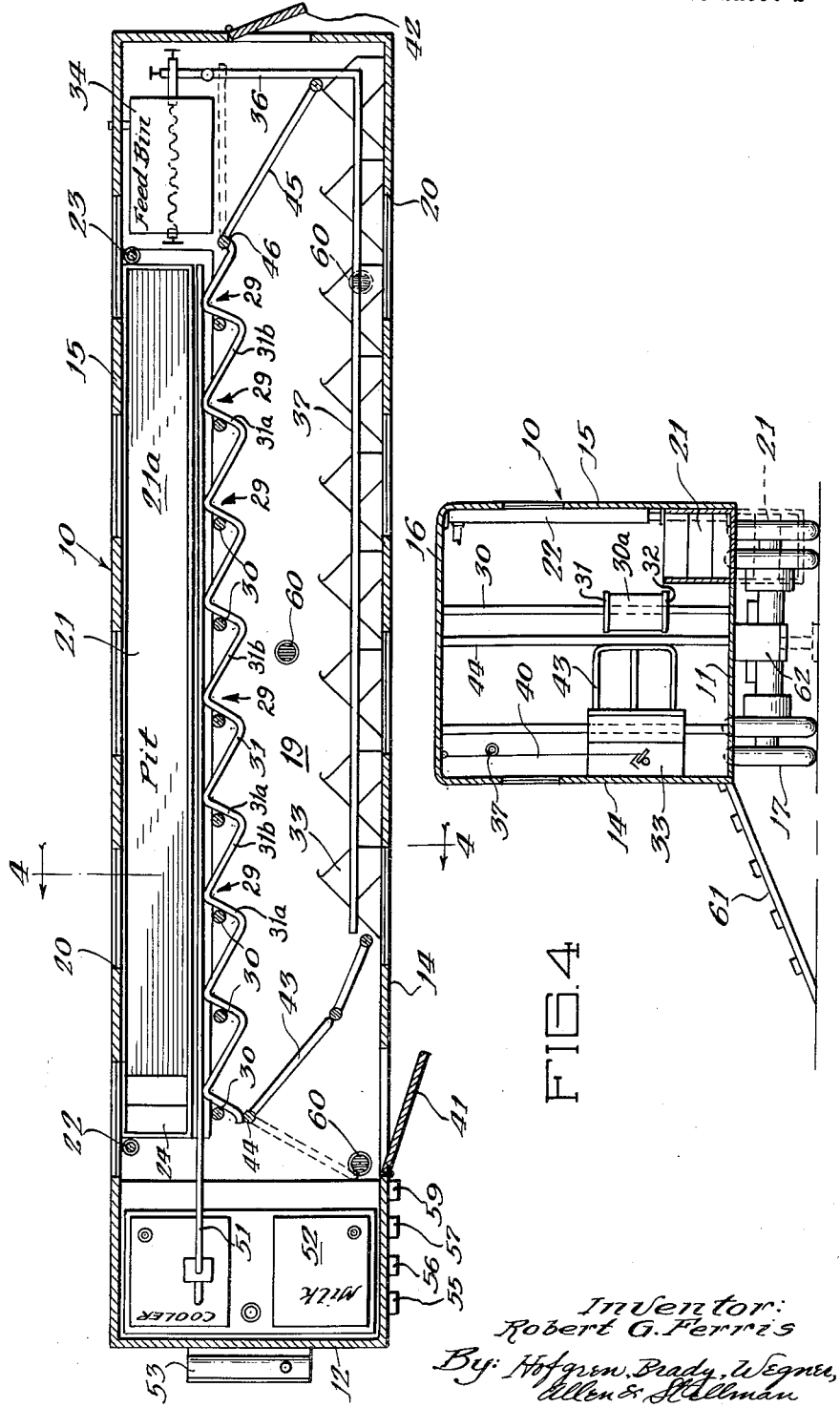

United States Patent Office 3,019,763
Patented Feb. 6, 1962

3,019,763
MOBILE MILKING HOUSE AND MILK ROOM
Robert G. Ferris, Harvard, Ill., assignor to Starline, Inc., a corporation of Illinois
Filed Jan. 14, 1960, Ser. No. 2,479
14 Claims. (Cl. 119—14.03)

This invention relates to a mobile milking room and milk house and to such a unit which embodies an entirely new concept by performing the entire milking operation for a plurality of farms in a local area and freeing the farmer and his family from milking chores.

As is well known, a farmer milking cows is closely confined to the farm because of the necessity for milking twice daily. The mobile milking room and milk house disclosed herein enables an independent trained crew to come to each farm in an area to handle the milking more quickly and efficiently. The unit can also handle the feeding of the cows and thus the mobile unit completely eliminates the need for the farmer's constant attention to the cows and the consequent necessity to be at the farm every day.

The mobile milking room and milk house unit embodies a trailer, truck or the like for highway travel and which contains all the equipment needed for milking and storage of milk including the necessary refrigeration equipment. The farmer can have a herd of milk cows without obtaining all the necessary equipment at a substantial expense and hiring milking help. With this unit, a farm need only have gates in the cow yard leading to the entrance and exit of the unit. The unit will pull up to these gates twice daily and the cows will pass into the interior of the unit where they are fed and milked and then returned to the cow yard. The unit also serves to prevent manure pile-up in the barn as is now the case with farmer milked cows.

A feature of this invention is a milk collecting, storing and transporting process in which trained operators are equipped with a mobile unit which has all the necessary equipment self-contained and has a predetermined round of stops at a plurality of small milk herd farms in a local area. In this process, the skilled operators travel with the mobile unit to a farm where the unit is placed in condition to receive cows which are then directed into the unit and placed in stalls in proper relation to milking equipment. Optionally usable feeding equipment may be mounted in the unit if desired. The cows are then milked by equipment in the unit, the milk conveyed to a storage tank and metered to determine the amount of milk produced by the cows at a farm and cooled for storage thereof while the mobile unit makes its rounds. The cows are then discharged from the unit which is placed in condition for travel and moved from one farm to the next. At each farm the cows can be trained to be ready for milking at a fixed time and a certain location. The unit will then arrive at the proper time and place.

A feature of this invention is to provide a mobile milking unit in the form of a milking room and milk house combination which is adapted to operate between farms in a local area consisting of an enclosed platform carrying stalls for cows and which may travel on a highway, having a single cow exit and a single cow entrance adjacent opposite ends of the platform and feeding equipment as well as milking equipment and milk storage facilities and service line connections whereby the entire milking operation may be performed by the mobile unit.

Another feature of the invention is to provide a mobile milking unit having wheels and a housing forming an enclosure for a platform supported by the wheels with the unit having a width not in excess of a permissible limit for travel along public roads and such unit having a plurality of stalls arranged to hold cows standing at an angle to a side wall of said housing with an operator's pit extending along the rear of the stalls within the enclosure and at a level beneath the platform to facilitate use of milking machines, a plurality of mangers mounted on the one side wall of the enclosure for receiving feed from a feed bin supplied to the mangers by a conveying system, a milking system in the trailer and a single entry and a single exit adjacent opposite ends of the platform whereby cows may enter and leave the enclosure from ramps carried by the unit or ramps forming part of the cow yard.

The invention is illustrated in the accompanying drawings in which:

FIG. 1 is a side elevational diagrammatic view of the mobile unit with the near side wall removed and with certain movable parts shown in broken line positions for performing a milking operation;

FIG. 2 is a vertical section taken generally along the line 2—2 in FIG. 1;

FIG. 3 is a diagrammatic plan view taken generally along the line 3—3 in FIG. 1; and FIG. 4 is a vertical section taken generally along the line 4—4 in FIG. 3 and showing the operator's pit in both full line and broken line positions and with the unit adjacent a cow entrance ramp of a cow yard and with a supporting wheel structure for the unit omitted.

As shown in the drawings, the mobile milking unit having a combination of a milking room and milk house comprises a trailer 10 having a platform or floor 11. A front end wall 12, a rear end wall 13, side walls 14 and 15 and a top wall 16 define an enclosure for the platform 11. The trailer is supported by wheels 17 to render the structure mobile and a tractor unit, indicated generally at 18, provides power for moving the unit as well as for operation of equipment within the unit. Although as shown the trailer 10 may be separated from the tractor unit 18, it is obvious that the tractor 18 and trailer 10 may be formed as an integral structure.

The enclosure is ventilated by a series of window openings 20 in the side walls 14 and 15 which may be suitably screened. As an alternate, the windows may remain closed and suitable ventilating equipment be carried by the unit as well as heating equipment for winter operation.

The trailer 10 will travel along public roads between farms and, therefore, must not have a width in excess of permissible safety limits. To accomplish this an animal floor area 19 having a herringbone stall arrangement is located within the enclosure with the arrangement shown in the drawings holding nine cows at a time while still providing space for an operator's pit 21 opposite sides of which are bounded by the animal floor area 19 and by the side wall 15 of the enclosure. The stalls extend inwardly from one side wall 14 of the enclosure and at the rear are spaced from the other side wall 15 a distance sufficient to enable a part of the platform 11 to constitute the operator's pit 21 which is arranged at a level beneath that of the remainder of the platform 11 when milking operations are being performed to facilitate use of the milking equipment. As shown in FIGS. 1 and 4 a pit floor 21a has a lowered position indicated in broken line and a raised position indicated in full line. Means are provided for moving the pit with one example being a pair of hydraulic jacks 22 and 23 which support the pit 21 and provide for movement thereof under suitable manual control. This permits the platform 21 to be lowered close to the ground whereby an operator is at a lower level than the cows and the platform is raised to provide sufficient road clearance when a milking operation is not taking place. The pit 21 has a series of steps 24 at one end leading to the pit floor 21a. Although the pit need not be movable it is so in the preferred embodiment since it enables a reduction in height of platform 11 to lessen the climb of cows into the unit.

As seen in FIG. 3 the herringbone stall arrangement consists of a series of open stalls 29 for confining cows generally side-by-side at an acute angle to the wall 14 with no obstructions to free passage of cows from end to end of the animal floor area. The rear of the stalls is defined by a series of vertical pipes or rods 30 extending between the platform 11 and the roof 16. The pipes or rods function to strengthen the roof and also as supports for shaped upper and lower pipes 31 and 32 which extend horizontally the length of the stall series to separate the pit 21 from the stall area while permitting cow access for attachment and removal of the milking equipment. As seen in FIG. 3, the pipes 31 and 32 are zigzagged so that each cow stall 29 has a rear portion including a rear rail, seen as 31a in FIG. 3, and a rump side rail, seen as 31b in FIG. 3, which limits a cow to the desired angle in the floor area 19. Each stall rear portion includes a splash shield 30a mounted on rails 31 and 32.

The front of each stall has a feed manger 33 carried by enclosure wall 14. The mangers 33 are supplied with feed from a feed bin 34 positioned at an end of the enclosure by means of a feed conveying system such as an auger system including a vertical tube 35, a cross tube 36 and a tube 37 extending lengthwise of the trailer with the tube 37 supplying a series of vertical tubes 38 which discharge individually into the upper ends of the mangers 33.

Each manger 33 holds a bulk supply of feed in the upper end thereof and by manual operation from a remote location a measured amount of feed may drop to a feed pan. The operation is performed by cables 40 with one cable running individually from each of the mangers 33 over suitable pulleys to a position adjacent the feed bin whereby an operator upon pulling the group of cables 40 may discharge feed to the manger feed pans.

In order for cows to enter and leave the enclosure, it is provided with adit and exit openings 41 and 42, respectively, in its opposite end portions, and said openings are provided, respectively, with doors 41a and 42a. These doors may be swinging ramps to provide for cow ingress and egress. The herringbone stall has an entrance with a gate 43 hinged on a vertical rod 44 for movement between the full line and broken line positions shown in FIG. 3. At the cow exit end of the stall, a gate 45 is hinged at 46 for swinging movement between the full and broken line positions shown in FIG. 3. It will be observed that gate 45 provides a barricade which is normally substantially parallel to the longitudinal lines of the bodies of cows in the stalls so as to guide the first cow of a group into proper position in the stall area. Suitable automatic control of the entrance gate 43 and exit gate 45 as well as the doors may be incorporated in the trailer 10.

The trailer 10 has milking equipment including a vacuum line 50 for operating conventional milking machines with there being a machine for each staal and a milk line 51. The lines 50 and 51 pass overhead at the rear of the stalls to provide a minimum amount of piping. The milk line 51 connects to a refrigerated cooler 52. A refrigeration unit 53 carried on the trailer is suitably connected to the cooler for this purpose. A metering unit 54 is mounted on the cooler 52 in the milk line 51 to measure the quantity of milk produced by the herd of a particular farmer so that he may be properly compensated. An alternative location for the cooler 52 would be under the platform 11 which would enable the use of a long rectangular tank to best utilize the space below the platform.

The trailer 10 has a service area with a series of connections which are completed when the trailer is in a fixed location including a drain connector 55 for the milk cooler 52, hose connectors 56 and 57 for hot and cold water with these connectors being suitably connected (not shown) to a line 58 extending over the stalls. A connector 59 is provided for electrical connection. As an alternative to the connections for hot water and electrical power, the unit may have its own source of electrical power and may have a heater for heating water.

A series of drains 60 are provided in the platform 11 for cleaning the trailer by utilization of the water supply.

The trailer 10 travels from one farm to another and at each farm is drawn up to the cow yard and into alignment with ramps with a ramp 61 being shown in FIG. 4 which leads to the cow entrance and another suitable ramp extending to the cow exit from the enclosure. Inasmuch as the trailer 10 is not intended for transport of livestock it is made as light as possible for travel on country roads. Cows are milked when the unit is stationary and the platform 11 is preferably maintained in a level and firm position in use by a plurality of hydraulic jacks 62 carried on the platform and shown extended to ground engagement in broken line in FIG. 1.

With the unit disclosed herein, a milking service may be offered to farmers with the unit travelling to a farm twice daily.

The foregoing detailed description is given for clearness of understanding only and no unnecessary limitations should be understood therefrom as modifications will be obvious to those skilled in the art.

I claim:

1. A milking device comprising: an elongated mobile support in the form of an enclosure having adit and exit openings in opposite end portions thereof; a plurality of animal positioning and feeding means along one side thereof; animal milking means associated with said animal positioning means for milking animals in said enclosure; an operator's platform along the opposite side thereof; and vertical adjusting means operatively connected to said platform whereby when the device is in an operative position said platform may be lowered and when in a transporting position may be elevated.

2. A milking device comprising: an elongated mobile support in the form of an enclosure having adit and exit openings in opposite end portions thereof; a plurality of animal positioning and feeding means along one side thereof; animal milking means associated with said animal positioning means for milking animals in said enclosure; and an operator's platform along the opposite side thereof.

3. A milking device comprising: an elongated mobile support in the form of an enclosure having adit and exit openings in opposite end portions thereof; an animal floor within and along one side of said enclosure; a plurality of positioning and feeding means for animals on said floor; animal milking means associated with said animal positioning means for milking animals in said enclosure; and an operator's platform along the opposite side of said enclosure at an operative position which is lower than said animal floor.

4. The device of claim 3 which includes vertical adjusting means operatively connected to said platform for moving the latter from said operative position to a more elevated transporting position.

5. The device of claim 3 in which the maximum length and width of the mobile support are no greater than those established for unrestricted travel on public roads.

6. The device of claim 3 in which the animal positioning means comprises a plurality of stall rear portions each of which has only a rear rail limiting movement of an animal toward the operator's platform and a short rump side rail integral with said rear rail which limits an animal substantially to a predetermined angle relative to said one side of said enclosure.

7. The device of claim 3 in which the feeding means includes mangers mounted against said one side of the enclosure.

8. The device of claim 7 which includes a feed bin and a feed conveying system for transporting feed from the bin to all the mangers.

9. The device of claim 3 in which the animal milking means includes a refrigerated milk storage tank carried on the mobile support, a vacuum line, and a fluid line connected to said tank.

10. The device of claim 9 in which the milking means includes metering means which indicates the amount of milk produced by animals milked in the milking device.

11. A milking device comprising: an elongated mobile support in the form of an enclosure having adit and exit openings in opposite end portions thereof; an animal floor within and along one side of said enclosure; a plurality of positioning and feeding means for animals on said floor, said positioning means including a movable barricade immediatelly within the exit opening of said enclosure, said barricade having a normal position disposed diagonally in the enclosure with an end adjacent said one side being farthest from the adit opening so as to guide the first animal of any group into a position with its head close to said one side and its body extending diagonally across said enclosure, and being movable to permit egress of animals from the enclosure through the exit opening; and an operator's platform along the opposite side of said enclosure at an operative position which is lower than said animal floor.

12. The device of claim 11 in which the animal positioning means includes a plurality of stall rear portions each of which has only a rear rail limiting movement of an animal toward the operator's platform and a short rump side rail integral with said rear rail and substantially parallel to said barricade, whereby animals on said floor are aligned generally parallel to said movable barricade and to one another.

13. A milking device comprising: an elongated mobile support in the form of a complete, generally rectangular enclosure having a floor, side and end walls, and a roof, together with adit and exit openings in opposite end portions of said enclosure, the dimensions of said support being such that it is adapted for unrestricted travel on public roads; a plurality of mangers along one side wall of said enclosure; animal positioning means associated with said mangers and arranged to position animals diagonally with respect to the enclosure and with their heads toward the end portion having the exit opening; and an operator's platform along the other side wall of said enclosure and occupying the entire space between said positioning means and said other wall.

14. The device of claim 13 in which the operator's platform occupies an operative position lower than the floor of said enclosure.

References Cited in the file of this patent

UNITED STATES PATENTS

| | | |
|---|---|---|
| 2,472,122 | Polivka | June 7, 1949 |
| 2,896,967 | Dalton | July 28, 1959 |
| 2,910,965 | Cann | Nov. 3, 1959 |
| 2,926,889 | Obes | Mar. 1, 1960 |
| 2,969,039 | Golay | Jan. 24, 1961 |

OTHER REFERENCES

J. W. Randolph et al.: "Portable Milking Parlor Goes to Cows," Agricultural Engineering, January 1956, pages 36–37, 41, volume 37, No. 1, St. Joseph, Michigan.